Patented Sept. 4, 1928.

1,683,559

UNITED STATES PATENT OFFICE.

PAUL LAEUGER, OF BASEL, SWITZERLAND, ASSIGNOR TO THE FIRM OF J. R. GEIGY S. A., OF BASEL, SWITZERLAND.

MANUFACTURE OF ACID DYESTUFFS OF THE PHENONAPHTHOSAFRANINE SERIES.

No Drawing. Original application filed February 4, 1927, Serial No. 166,021, and in Germany February 13, 1926. Divided and this application filed December 28, 1927. Serial No. 243,210.

This application is divisional of application Ser. No. 166021 filed February 4, 1927.

According to the present invention, reddish blue to blue acid dyestuffs of the phenonaphthosafranine series which, when dyed, are fast to alkali, very fast to light and for the greatest part have good equalizing properties, are obtained by condensing a para-amino-phenol derivative having a sulpho-group in ortho position to the amino-group according to the formula:

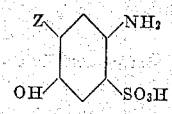

with an isorosindulinesulphonic acid of the general formula:

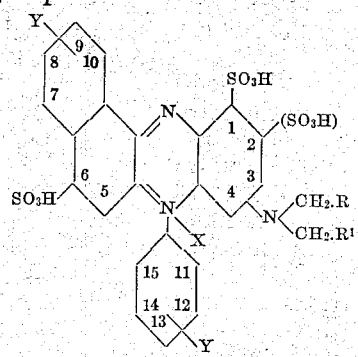

having at least two sulpho-groups, one of them being in position 6, the other in one of the positions 1 and 2 and the third, if it be present, in any position, whereby in the above formulæ Z represents hydrogen, alkyl, alkoxy and halogen, X an acid radical, such as $SO_3H$, and Y a univalent radical, such as sulpho, halogen, alkyl, alkoxy, acidylamino, etc., whilst R and $R^1$ stand for hydrogen, alkyl and aryl.

The reaction takes places according to the following formula:

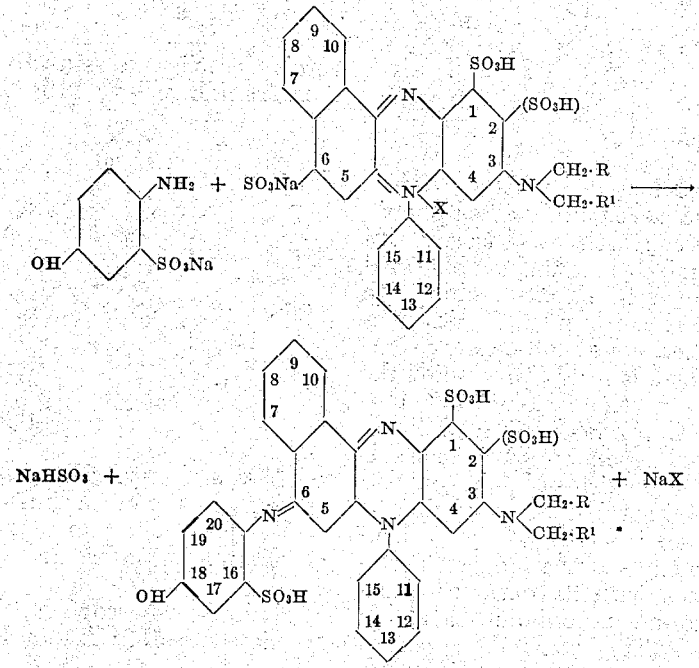

The resulting phenonaphthosaphranine-sulphonic acids are characterized by the ortho —(16)—position of one sulpho-group to the safranine-nitrogen, which has the effect in general of improving the solubility and the fastness to fulling as well as a marked shifting of the tints toward green-blue. Especially owing to this —16— sulpho-group the dyestuffs are fast to alkali.

The dyestuffs obtained according to this process are soluble in water and in sulphuric acid.

This process of manufacture could not be foreseen, since no similar kind of condensation with ortho-aminoarylsulphonic acids has been discovered and the known hindering effect upon the reactions possessed by strong acid radicals in ortho-position to the amino-group did not allow of a prospect of success. Whilst derivatives of para-phenylene-diamine yield blue to blue-green dyestuffs of outstanding clearness of tint and pronounced fastness especially to alkali and light, it is to be noted that with the corresponding derivatives of para-amino-phenols redder-blue tints of similar properties are obtained.

The isorosinduline-6-sulphonic acids used as parent materials can be made from the sulphonic acids of the neutral blue series by treatment with sulphites in accordance with U. S. patent specification No. 617,703 and subsequent oxidation. Positions 4 and 8 to 15 may contain alkyl-, alkyloxy-, hydroxy-, carboxy- or acidylamino-groups and halogen.

The following example illustrates the invention, the parts being by weight.

This example relates to the manufacture of the dyestuff of the formula:

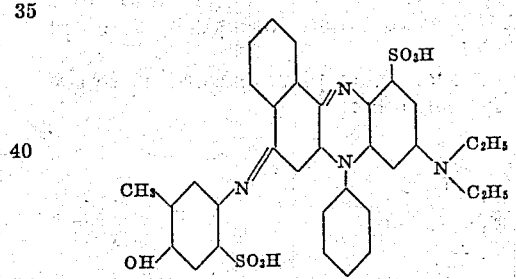

The parent material used for the manufacture thereof is the isorosindulinedisulphonic acid obtained by converting the isorosinduline-1-sulphonic acid, which may be obtained by condensing phenyl-2-naphtylamine with an azodyestuff derived from any diazocompound with 1-diethylamino-3-benzene sulphonic acid, according to the process of the U. S. patent specification No. 617,703, into the diethylisorosinduline-1:6-disulphonic acid, which dissolves in concentrated sulphuric acid to a brownish-red solution and dyes wool muddy blue. 54 parts of the diethylisorosinduline-1:6-disulphonic acid thus obtained are boiled for a longer time in a reflux apparatus with 21 parts of para-amino-ortho-cresol-meta-sulphonic acid in solution feebly alkaline with sodium carbonate with addition of 20 parts of sodium acetate. The beautifully crystalline dyestuff separates on salting out; it dissolves to a green solution in sulphuric acid and dyes wool reddish blue tints. In addition to good equalizing power this dyestuff exhibits improved properties of fastness to alkali and light as compared with the 17-sulphonic acid isomeric with it.

What I claim is:—

1. A process for the manufacture of equalizing acid dyestuffs of the phenonaphthosafranine series fast to alkali, consisting in condensing a para-aminophenol derivative having a sulpho-group in ortho position to the amino-group according to the general formula:

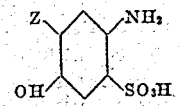

with an isorosinduline sulphonic acid with at least two sulpho-groups according to the general formula:

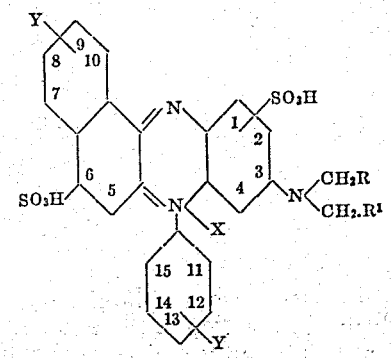

where R and $R^1$ represent hydrogen, alkyl or aryl, whilst Z represents hydrogen, alkyl, alkoxy and halogen, X an acid radical and Y a univalent radical.

2. As a new article of manufacture, the herein described dyestuff of the phenonaphthosafranine series of the constitution:

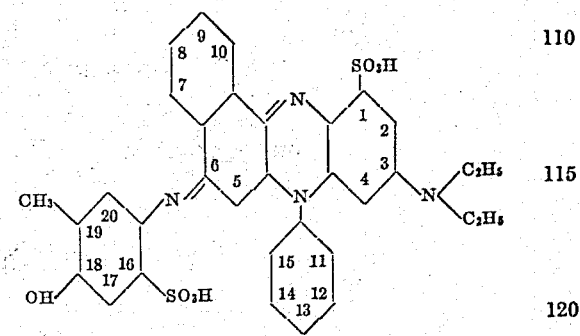

constituting a crystalline body, dissolving to a green solution in sulphuric acid and dyeing wool reddish blue tints of good equalizing power and improved fastness to light and alkali.

In witness whereof I have hereunto signed my name this 15th day of December 1927.

PAUL LAEUGER.